(12) United States Patent
Parra et al.

(10) Patent No.: US 11,755,305 B2
(45) Date of Patent: Sep. 12, 2023

(54) AUTOMATIC UPDATE SCHEDULER SYSTEMS AND PROCESSES

(71) Applicant: INTERNATIONAL BUSINESS MACHINES CORPORATION, Armonk, NY (US)

(72) Inventors: Jaime J R Parra, Leander, TX (US); Ryan Myers, Austin, TX (US); Guillermo Nunez, Manor, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/910,616

(22) Filed: Jun. 24, 2020

(65) Prior Publication Data

US 2021/0405991 A1 Dec. 30, 2021

(51) Int. Cl.
*G06F 8/65* (2018.01)
*G06F 8/61* (2018.01)
(Continued)

(52) U.S. Cl.
CPC .............. *G06F 8/65* (2013.01); *G06F 8/61* (2013.01); *G06F 9/4406* (2013.01); *G06F 9/4411* (2013.01); *G06F 9/4881* (2013.01); *G06F 9/542* (2013.01); *G06F 11/3006* (2013.01); *G06F 18/2148* (2023.01); *G06F 18/24* (2023.01); *G06N 20/00* (2019.01)

(58) Field of Classification Search
CPC .. G06F 8/60–71; G06F 9/4406; G06F 9/4411; G06F 9/4881; G06F 9/542; G06F 11/3006; G06N 20/00; G06N 3/08; G06K 9/6257

USPC .................................................. 717/168–178
See application file for complete search history.

(56) References Cited

U.S. PATENT DOCUMENTS 6,912,386 B1  6/2005  Himberg et al.
6,944,854 B2  9/2005  Kehne et al.
(Continued)

FOREIGN PATENT DOCUMENTS

WO  WO-2015086090 A1 *  6/2015  .............. G06F 8/60

OTHER PUBLICATIONS

Berfield, A., et al., Better Client OFF Time Prediction to Improve Performance in Web Information Systems, WIDM '01: Proceedings of the 3rd international workshop on Web information and data management, Nov. 2001, pp. 39-46, [retrieved on Sep. 6, 2019], Retrieved from the Internet: <URL:http://dl.acm.org/>.*
(Continued)

*Primary Examiner* — Geoffrey R St Leger
(74) *Attorney, Agent, or Firm* — Daniel Yeates; Andrew D. Wright; Calderon Safran & Cole P.C.

(57) ABSTRACT

A computer-implemented method includes: registering, by a computer device, a device to a network; collecting, by the computer device, device data from the device through the network; compiling, by the computer device, training data from the collected device data; training, by the computer device, a machine learning model using the training data; predicting, by the computer device and using the machine learning model, a time when the device will be in an inactive system state; and automatically scheduling, by the computer device and based on the predicting, an application of an update for the time when the device is in the inactive system state.

20 Claims, 6 Drawing Sheets

(51) Int. Cl.
  *G06F 9/4401* (2018.01)
  *G06N 20/00* (2019.01)
  *G06F 9/54* (2006.01)
  *G06F 11/30* (2006.01)
  *G06F 9/48* (2006.01)
  *G06F 18/214* (2023.01)
  *G06F 18/24* (2023.01)

(56) References Cited

U.S. PATENT DOCUMENTS

| | | |
|---|---|---|
| 6,948,099 B1 | 9/2005 | Tallam |
| 7,000,229 B2 | 2/2006 | Gere |
| 8,341,617 B2 | 12/2012 | Bunn |
| 8,631,254 B2 | 1/2014 | Kwak |
| 10,789,057 B2 * | 9/2020 | Vichare ............... G06F 8/60 |
| 10,841,791 B1 * | 11/2020 | Zhang ............... H04W 72/1247 |
| 10,908,891 B2 * | 2/2021 | Nakaguma ............... G06F 21/57 |
| 10,936,296 B2 * | 3/2021 | Mitra ............... G06F 16/903 |
| 2013/0232481 A1 * | 9/2013 | Yamashita ............... G06F 9/445 |
| | | 717/177 |
| 2014/0149644 A1 * | 5/2014 | Park ............... G06F 8/654 |
| | | 711/103 |
| 2014/0244710 A1 | 8/2014 | Sharma et al. |
| 2015/0169311 A1 | 6/2015 | Dickerson et al. |
| 2017/0010874 A1 * | 1/2017 | Rosset ............... H04L 67/34 |
| 2017/0017478 A1 | 1/2017 | Briggs et al. |
| 2017/0192796 A1 * | 7/2017 | Kunjuraman ............... G06F 8/65 |
| 2019/0155594 A1 * | 5/2019 | Nakaguma ............... H04L 67/34 |
| 2019/0250899 A1 | 8/2019 | Riedl et al. |
| 2020/0019393 A1 * | 1/2020 | Vichare ............... G06F 8/60 |
| 2020/0356354 A1 * | 11/2020 | Mitra ............... G06F 16/903 |
| 2021/0034350 A1 * | 2/2021 | Chen ............... G06N 20/00 |

OTHER PUBLICATIONS

Mell et al., "The NIST Definition of Cloud Computing", NIST, Special Publication 800-145, Sep. 2011, 7 pages.

* cited by examiner

AUTOMATIC UPDATE SCHEDULER SYSTEMS AND PROCESSES

BACKGROUND

Aspects of the present invention relate generally to device updates and, more particularly, to automatic update scheduler systems and processes.

Updates are common occurrence for user devices such as smartphones. For example, the operating system of a smartphone may be periodically updated by a service provider. During such updates, the user device is typically unavailable for use by the user.

SUMMARY

In a first aspect of the invention, there is a computer-implemented method including: registering, by a computer device, a device to a network; collecting, by the computer device, device data from the device through the network; compiling, by the computer device, training data from the collected device data; training, by the computer device, a machine learning model using the training data; predicting, by the computer device and using the machine learning model, a time when the device will be in an inactive system state; and automatically scheduling, by the computer device and based on the predicting, an application of an update for the time when the device is in the inactive system state.

In another aspect of the invention, there is a computer program product including one or more computer readable storage media having program instructions collectively stored on the one or more computer readable storage media. The program instructions are executable to: register devices to a network; collect data from the devices; compile training data from the collected data; train a machine learning model using the training data; classify regions of the network which contain the devices as an inactive region or an active region based on the machine learning model; predict when a device of the devices is in an inactive system state based on determining that the device is in the inactive region of the network; automatically schedule an update for when the device is in the inactive system state; apply the update when the device is in the inactive system state; and notify a user of the application of the update to the device in the inactive system state.

In another aspect of the invention, there is system including a processor, a computer readable memory, one or more computer readable storage media, and program instructions collectively stored on the one or more computer readable storage media. The program instructions are executable to: register devices to a network; collect data from the devices; compile the collected data as training data; train a machine learning model using the training data; classify regions of the network which contain the devices as an inactive region or an active region based on the machine learning model; predict when the devices are in the inactive region of the network; determine a device of the devices in the inactive region of the network is in an inactive system state; automatically schedule an update for application to the device in the inactive system state; apply the update to the device in the inactive system state; and notify a user of the application of the update to the device.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
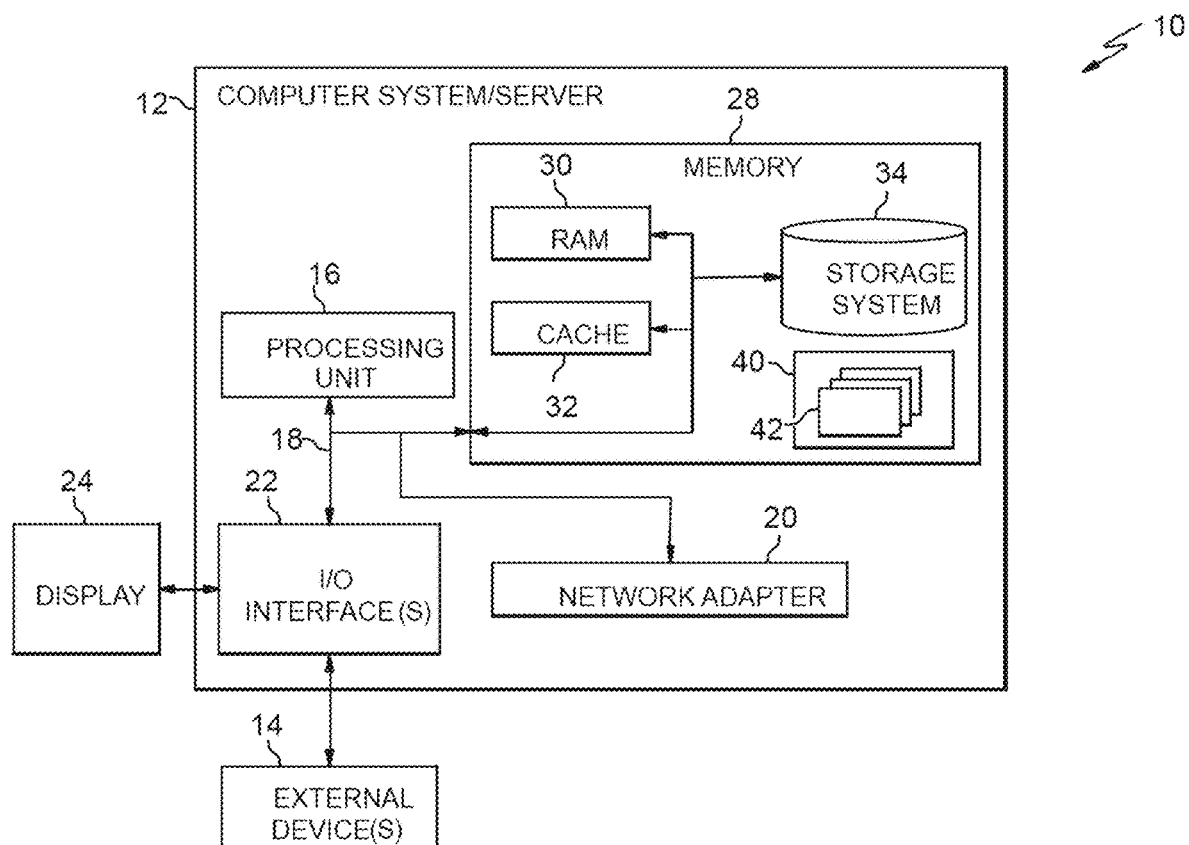
FIG. 1 depicts a cloud computing node according to an embodiment of the present invention.

Aspects of the present invention relate generally to device updates and, more particularly, to automatic update scheduler systems and processes. In embodiments, an update scheduler system collects smart data with respect to devices for determining periods of device inactivity or relatively low usage. In view of this determination, the update scheduler system automatically schedules updates for devices during these periods of device inactivity or relatively low usage. Accordingly, in response to receiving an update (e.g., from a service provider), the update scheduler system intercepts the update and provides the update to the device during these periods of device inactivity or relatively low usage. In this way, the update scheduler system determines an optimal time for providing updates to devices which do not inconvenience the user.

Device updates can be automatically scheduled at times when it is presumed that most users are not using their device. For example, some device updates are pushed and scheduled to automatically occur between 3 AM-5 AM, when it is presumed that the device is connected to a power source for charging and not being used during this overnight period. However, this one size fits all assumption does not work well with all users. For example, some users prefer to use their devices at the times that are presumed to be non-use times. In these instances, when an update is received while the user is using or needs to use their device, two problems arise: 1) the user loses access to the device in order for the device to receive the update; or 2) the user postpones the update and misses out on important features provided by the update. To avoid these problems, some devices include an update notification, which prompts the user to either update now, update at a later time or to dismiss the update notification. In one example, the later times include one hour, tonight, or tomorrow. Accordingly, the update notification provides the user with some control by allowing the user to choose a time in which the user believes they will not be using their device. However, if the user desires to use the device during this later time, the problem of device unavailability arises again. Further, if the user dismisses the update notification, the device will not be running on the most up to date software.

Embodiments of the present disclosure include a method for collecting information about a configuration and location of smart devices in a user's environment and collecting information such as device groups (e.g. multiple devices grouped to act as a single entity), home automations, device providers, etc. Further, from all the information gathered about the system, the method compiles training data to train and generate a machine learning model. Additionally, the method includes monitoring instructions for any device in the system which includes toggling a device on/off, tripping a motion sensor, a user automation routine activates, etc. In addition, the method includes classifying regions in the user's environment which contain inactive or idle devices. In embodiments, this preprocessing includes determining where in the network the target devices are located as well as analyzing the smart data surrounding the changed state of the device. Additionally, the method includes analyzing the user's usage of a device by collecting smart data such as location data, motion sensor data mapping activity to another region of the network, services on the target device(s), etc. This smart data helps manipulate the input vectors to better classify regions of inactivity. The method further includes identifying whether an update will cause loss of operation on a target device, and applying the update to the target device based on the model and determining that the target device is in a region of the user's environment classified as containing inactive or idle devices.

Implementations of the invention allow for improvements to a functioning of a computer device by preventing device interruption from pushed updates. In embodiments, an update scheduler module of an update scheduler system provides this prevention by collecting smart data of a device including location data, room-based data, motion sensor data, number of apps/services running on the device, usage of sleep tracking apps, and other device metrics. In view of this smart data, the update scheduler module determines periods of computer device inactivity or relatively low usage and automatically schedules the updates for these periods of device inactivity or relatively low usage. Specifically, the update scheduler module identifies periods of device inactivity or relatively low usage by compiling training data from the smart data and training a machine learning model in view of the training data. In this way, computer devices are available for updates without inconveniencing the user. Accordingly, computer devices operate on the most up-to-date software by receiving the latest updates without interrupting the productivity of the user, thereby improving the functioning of a computer device by preventing device interruption.

Implementations of the invention also allow for a practical application by allowing updates without interrupting the productivity of the user. In embodiments, the update scheduler module determines and/or identifies periods of device inactivity or relatively low usage. Further, the systems and processes described herein schedule updates to occur during these periods of device inactivity or relatively low usage. In this way, the present disclosure provides the practical application of device updates without device interruption. Accordingly, devices operate on the most up-to-date software by receiving the latest updates without interrupting the productivity of the user.

In addition, the steps to automatically schedule updates are unconventional. In embodiments, prior to a device receiving an update, the update scheduler module implements steps for: a) collecting smart data of devices connected to a smart network including location data, room-based data, motion sensor data, number of apps/services running on the device, usage of sleep tracking apps, and other device metrics; b) collecting smart data for devices not connected to the smart network; c) compiling training data from the collected data; d) training a machine learning model in view of this training data for determining periods of computer device inactivity or relatively low usage; and e) automatically scheduling updates for these periods of device inactivity or relatively low usage. In view of this arrangement of steps, the systems and processes allow for devices to operate on the most up-to-date software by receiving the latest updates while also preventing device interruption for a user.

It should be understood that, to the extent implementations of the invention collect, store, or employ personal information provided by, or obtained from, individuals (for example, device usage of a user), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
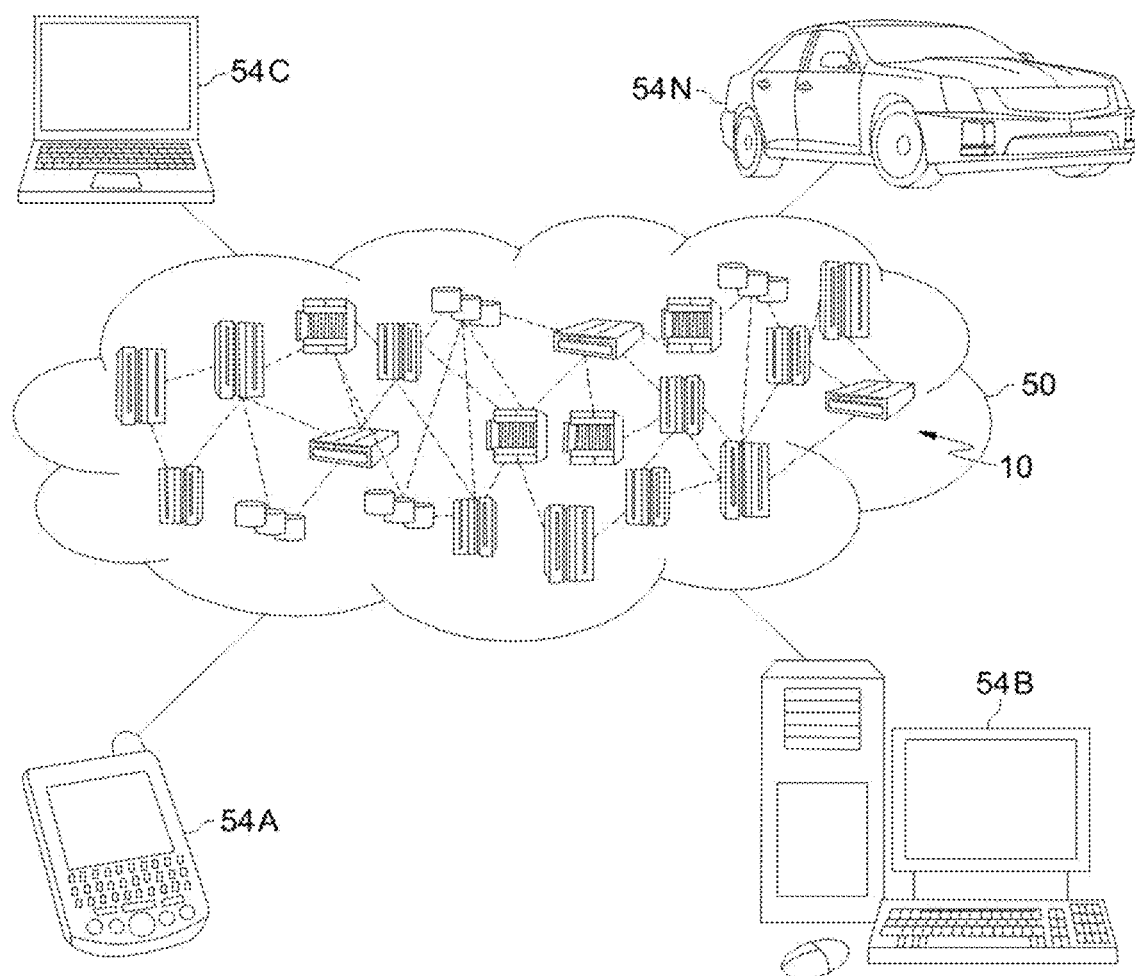
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
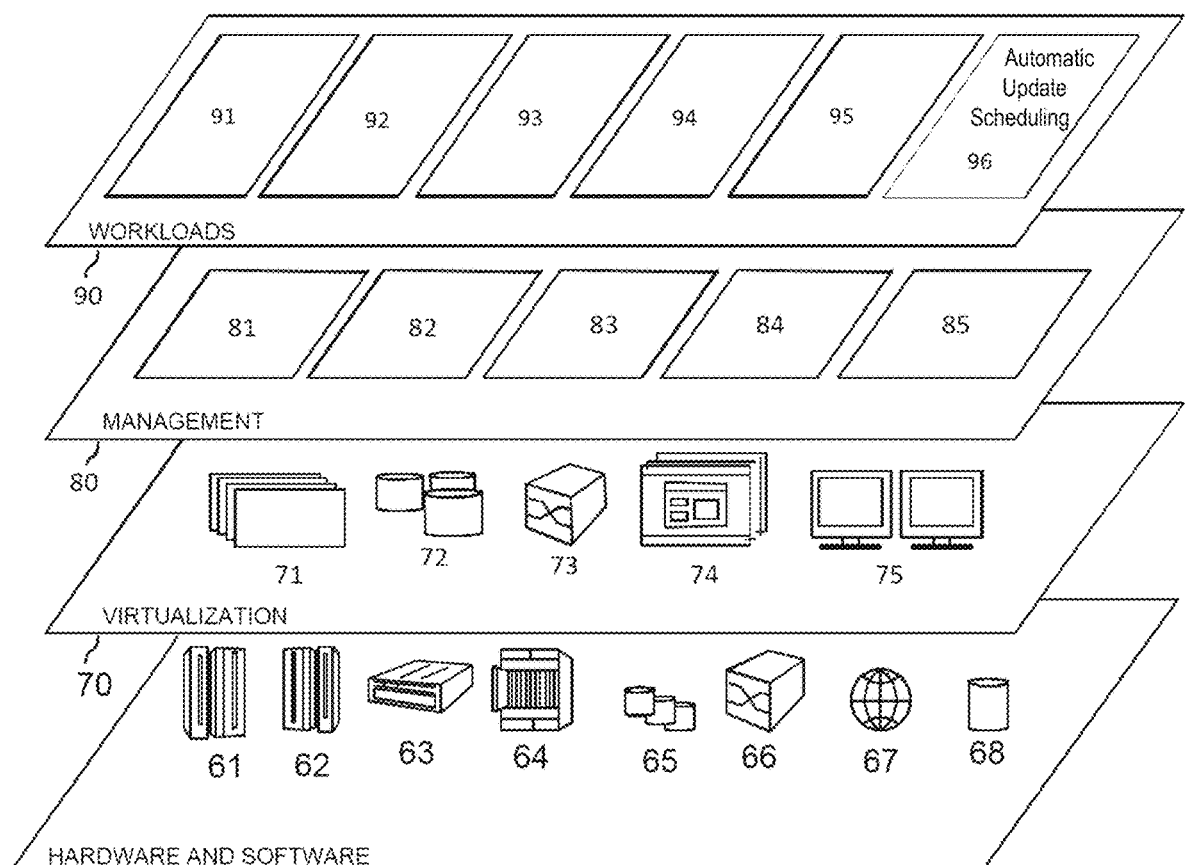
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatic update scheduling 96.

Implementations of the invention may include a computer system/server 12 of FIG. 1 in which one or more of the program modules 42 are configured to perform (or cause the computer system/server 12 to perform) one of more functions for the automatic update scheduling 96 of FIG. 3. For example, the one or more of the program modules 42 may be configured to: collect smart data of a device including location data, room-based data, motion sensor data, number of apps/services running on the device, usage of sleep tracking apps, and other device metrics; compile training data from the smart data; train a machine learning model in view of this training data for determining periods of computer device inactivity or relatively low usage; and automatically schedule updates for these periods of inactivity or low usage, to provide automatic update scheduling.

Figure 4:
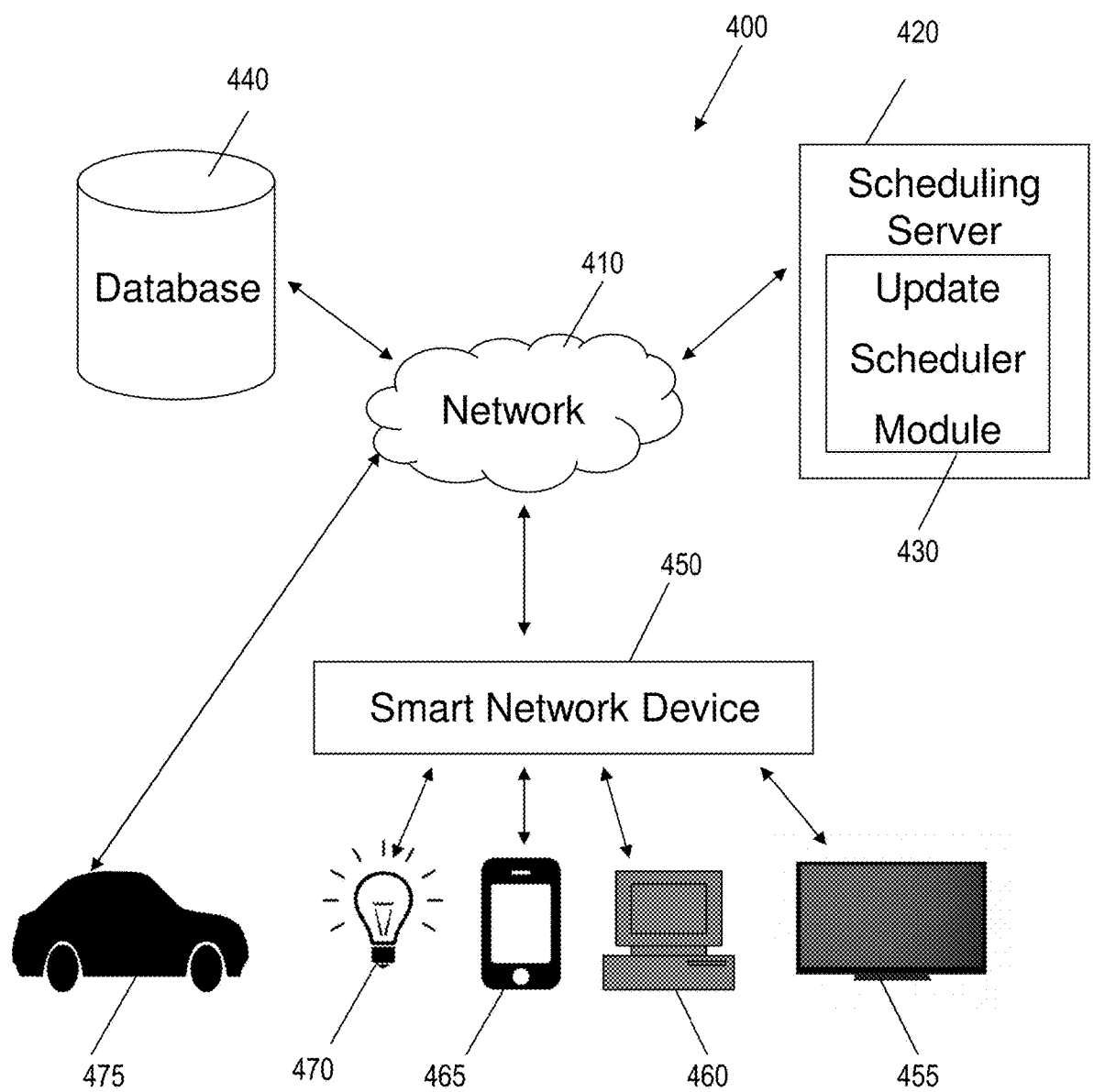
FIG. 4 shows a block diagram of an exemplary environment in accordance with aspects of the invention.

FIG. 4 shows a block diagram of an exemplary environment 400 in accordance with aspects of the invention. In embodiments, the environment 400 includes a network 410, a scheduling server 420, a database 440, a smart network device 450 and computing devices 455, 460, 465, 470, and 475. The scheduling server 420 is a computing device comprising one or more components of computer system/server 12 of FIG. 1. In embodiments, the scheduling server 420 comprises an update scheduler module 430, which comprises one or more program modules such as program modules 42 described with respect to FIG. 1. The scheduling server 420 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, the network 410 is any suitable network including any combination of one or more of a LAN, WAN, or the Internet. In a particular embodiment, the network 410 is representative of a cloud computing environment as described in FIG. 2.

In embodiments, the smart network device 450 is a smart home network device acting as a smart hub for a smart home network and includes one or more components of the computer system/server 12 of FIG. 1. In embodiments, the devices in the smart home network are devices having a high rate of interaction by a user, and may include, for example, smartphones, laptop and desktop computers, smart bulbs, smart watches, smart cars, etc. In one example, the devices 455, 460, 465, 470, and 475 are configured for receiving and applying an update from a parent service. In this way, a target device is a device which the parent service targets with an update. In one example, the parent service is a manufacturer of the device and the update is for an operating system of one of the devices 455, 460, 465, 470, and 475.

In embodiments, a user registers and connects the devices 455, 460, 465, and 470 to the smart network device 450. In an example, this includes the user registering the devices 455, 460, 465, and 470 by pairing or bonding to the smart network device 450. In another example, the user manually registers the devices to the smart network device 450.

In embodiments, the user provides permissions to the update scheduler module 430 to collect the smart data of the devices 455, 460, 465, and 470 directly from the smart network device 450. In one example, this includes the user providing permission manually by selecting a setting in the smart network device 450.

In embodiments, the update scheduler module 430 determines inactive regions of the smart network in view of the smart data from the devices 455, 460, 465, and 470. In an example, this includes the update scheduler module 430 collecting the smart data of the devices 455, 460, 465, and 470 and determining which devices are in an inactive system state from the smart data. In view of this determination, the update scheduler module 430 determines that these regions containing the devices in the inactive system state are inactive regions of the smart network. In this way, the update scheduler module 430 utilizes a small-scale Internet of Things (IoT) approach for collecting smart home data from the devices 455, 460, 465, and 470 for determining inactive regions. Alternatively, the update scheduler module 430 determines active regions of the smart network in view of the smart data from the devices 455, 460, 465, and 470 indicating that the devices 455, 460, 465, and 470 are in the active system state. In embodiments, the update scheduler module 430 collects the smart data of the devices 455, 460, 465, and 470 from the smart network device 450 through an application programming (API) interface of the smart home network device 450 for devices 455, 460, 465, and 470.

In embodiments, for devices not connected to the smart network device 450, e.g., device 475, the user registers and connects the device directly to the update scheduler module 430. In one example, the device 475 is a smart car and the user provides the update scheduler module 430 permission to access the device 475 for collecting smart data for the device 475 directly through the network 410. In one example, the user manually registers the device 475 with the update scheduler module 430. In this way, the update scheduler module 430 also collects smart data for devices not connected to the smart network device 450. Accordingly, the update scheduler module 430 collects smart data over a period of time for all devices 455, 460, 465, 470, and 475.

In embodiments, the smart data includes location data, room-based data, motion sensor data, number of apps/services running on the device, usage of sleep tracking apps, and other device metrics. Examples of location data include location coordinates of a device. For example, the location data may indicate the GPS coordinates of the device 460. Examples of room-based data include a specific room of the home in which the smart network device 450 is located. For example, the room-based data may indicate that a location of the device 470 is within a particular room of the home or region of the smart home network. Examples of motion sensor data include data from one or more motion sensors throughout the home. Examples of apps/services running on the device include social media apps, ridesharing apps, sleep tracking apps, etc.

In embodiments, other examples of the smart data includes device groups (e.g., multiple smart devices grouped to act as a single entity), home automations, device providers instructions, and user setups, amongst other examples. In one example, an instruction is a message to toggle a device on/off, trip a motion sensor, and activate a user automation routine, amongst other examples.

In embodiments, the update scheduler module 430 stores the collected smart data within the database 440. In a preferred embodiment, the update scheduler module 430 continuously collects smart data and stores it within the database 440.

In embodiments, the update scheduler module 430 compiles the stored smart data to generate training data for a machine learning model. In one example, compiling the training data includes the update scheduler module 430 labeling the collected smart data in view of the devices 455, 460, 465, 470, and 475. For example, the update scheduler module 430 labels the smart data of device 455 as smart tv data.

In embodiments, the update scheduler module 430 generates the machine learning model for analyzing the compiled data. In one example, generation of the machine learning model includes the update scheduler module 430 defining parameters and objectives. In embodiments, an objective of the machine learning model is determining a system state of the device.

In embodiments, an active system state represents that the device is in use by the user. Accordingly, applying the update to the device in the active system state interrupts the user. Alternatively, an inactive system state represents that a user is not currently using the device. In further embodiments, the inactive system state represents that the device is in a low-usage state. In one example, a low-usage state indicates the device is in a lower powered state than a powered state of the device in the active system state. Accordingly, applying the update to the device in the inactive system state does not interrupt the user from using the device, thereby making the device a candidate for receiving an update. In this way, candidate devices are devices in the inactive system state.

In embodiments, the update scheduler module 430 applies a classification algorithm to the smart data within the database 440 to pre-process the system state and usage statistics of each device of the devices 455, 460, 465, 470, and 475. In one example, the classification algorithm is support vector machines (SVMs). SVMs are an example for the classification algorithm because of strength for classifying data and real-time prediction. In embodiments, the classification algorithm classifies the smart data into discrete categories representing the system state. In one example, the first discrete category represents the device in the active system state, while a second discrete category represents the device in the inactive system state.

In embodiments, the classification algorithm generates a classification data model by assigning each discrete category a numerical value. In one example, the SVMs assign a value of 1 for smart data representing the active system state and a numerical value of 0 to smart data representing the inactive system state. Accordingly, upon receipt of smart data from any one of the devices 455, 460, 465, 470, and 475, the update scheduler module 430 applies the classification data model to the smart data for determining the candidate devices.

In embodiments, the update scheduler module 430 identifies from the collected smart data future periods when the device is in the inactive system state. In an example of identifying the future periods, the update scheduler module 430 determines that at certain time periods, the classification data model classifies the device in the inactive system state. In view of the classification for this specific time period, the update scheduler module 430 determines that the device 460 is in the inactive system state. Accordingly, the update scheduler module 430 identifies from the classifications the future periods when the device is in the inactive system state.

In embodiments, the update scheduler module 430 generates a profile for the devices 455, 460, 465, 470, and 475 from the collected smart data. In embodiments, the profile of each device includes periods of time when the devices 455, 460, 465, 470, and 475 are in the active system state or the inactive system state. In an example of generating the profile, the machine learning model determines from the collected smart data that at certain time periods, the classification data model classifies the device in the inactive system state. Accordingly, the profile of device 460 includes these certain time periods for when the classification data model classifies the device 460 is in the inactive system state. In view of the classifications, the machine learning model predicts when the device is in the inactive system state. In view of this learning by the update scheduler module 430 of when the device will be in the inactive or active system state, for future updates, the update scheduler module 430 predicts when the device will be in the inactive system state.

In embodiments, the update scheduler module 430 identifies devices which receive updates. In one example, this includes the update scheduler module 430 identifying devices by performing a handshake with each device of the devices 455, 460, 465, 470, and 475. In embodiments, the update scheduler module 430 performs the handshake with the devices 455, 460, 465, and 470 through the smart home network 450. In further embodiments, the update scheduler module 430 performs the handshake directly with device 475. In embodiments, handshaking allows for establishing communication channels between the update scheduler module 430 and the devices 455, 460, 465, 470, and 475 to identify the devices.

In embodiments, the update scheduler module 430 checks the parent services of these devices for determining which handshake devices of the devices 455, 460, 465, 470, and 475 are targeted for updates. In one example, the update scheduler module 430 checks directly with the parent services. In embodiments, checking the parent service includes checking whether an update is available for the devices 455, 460, 465, 470, and 475, whether the update will cause a loss of operation for the devices 455, 460, 465, 470, and 475, and whether an update notification is being sent to a device of the devices 455, 460, 465, 470, and 475. In view of checking with the parent service and determining an update availability, the update scheduler module 430 determines the update is needed for at least one of the devices of devices 455, 460, 465, 470, and 475.

In embodiments, the update scheduler module 430 withholds an update notification by intercepting the update notification in response to the parent service sending the update notification to the device in the active system state. In this way, the update scheduler module 430 withholds the update from the device in the active system state. Alternatively, for candidate devices (devices in the inactive system state), the update scheduler module 430 allows the candidate device to receive the update notification from the parent service. In further embodiments, the update scheduler module 430 withholds updates from devices in the active region of the smart home network. In embodiments, the update scheduler module 430 displays the update notification on an interface of the device.

In embodiments, the update scheduler module 430 determines the system state for the device which needs the update. In one example, the update scheduler module 430 collects current smart data for the device and applies the machine learning model to the current smart data to determine whether the device is currently in the active system state or in the inactive system state. In embodiments, the update scheduler module 430 determines the system state for the device from the device profile.

In embodiments, in response to either determining the device is in the inactive system state or predicting the device will be in the inactive system state, the update scheduler module 430 automatically schedules an update for application to the device in the inactive system state. In this way, applying updates to devices occurs by applying updates to the devices during periods of device inactivity or relatively low usage to minimize the amount of actual operation loss to the user. Accordingly, the devices 455, 460, 465, 470, and 475 operate with the most up-to-date software by receiving the latest updates without interrupting the productivity of the user, thereby improving the functioning of the devices 455, 460, 465, 470, and 475.

In embodiments, the update scheduler module 430 automatically applies the update to the device in the inactive system state. In one example, this includes the update scheduler module 430 automatically updating an operating system of the device in the inactive system state.

In embodiments, after applying the update, the update scheduler module 430 notifies the user of the applied update. In one example, the update scheduler module 430 notifies the user of the update by causing the interface of the updated device to display a notification indicating that the device is updated. In response to the device being updated, the update scheduler module 430 returns to collecting smart data from the devices 455, 460, 465, 470, and 475.

In embodiments, in response to determining the device is in the active system state, the update scheduler module 430 waits for applying the update until the device is in the inactive system state. In this way, the update scheduler module 430 schedules the update for when the device is in the inactive system state. In one example, the update scheduler module 430 determines when the device is in the inactive system state by collecting the current smart data for the device. For example, an the current smart data includes an instruction for a device action for toggling the device off. The update scheduler module 430 determines the device is in inactive system state in view of the instruction. In another example, the update scheduler module 430 identifies the future periods of when the device is in the inactive system state. In response to determining the device is now in the inactive system state, the update scheduler module 430 applies the update. In embodiments, for a device being in the active system state, the update scheduler module 430 monitors the instructions to determine when the device is in the inactive system state.

Figure 5:
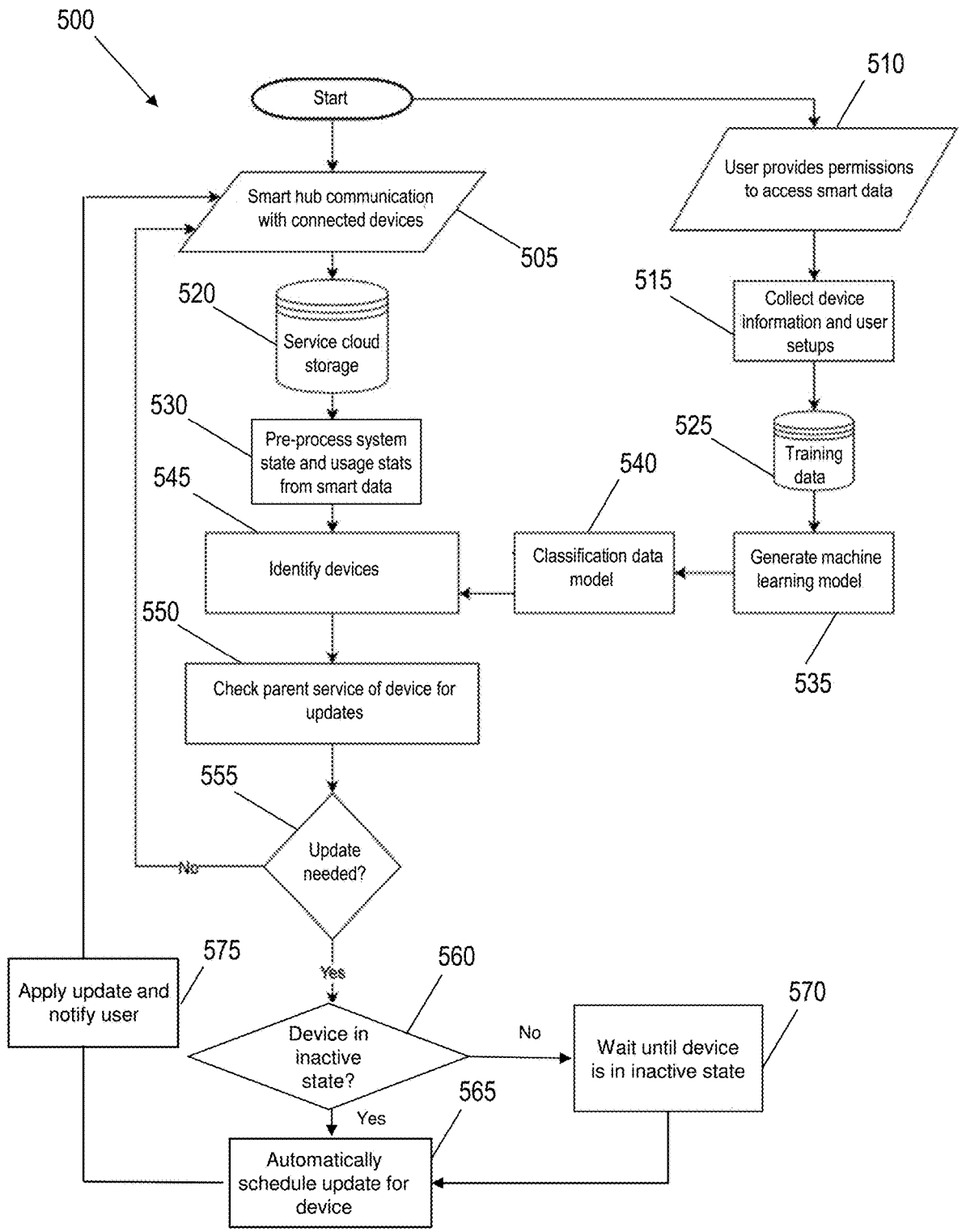
FIG. 5 shows a flowchart of an exemplary method in accordance with aspects of the invention.

FIG. 5 shows a flowchart 500 of an exemplary method in accordance with aspects of the invention. Steps of the method may be carried out in the environment of FIG. 4 and are described with reference to elements depicted in FIG. 4. At step 505, a smart hub communicates with connected devices. In embodiments, and as described with respect to FIG. 4, this includes the user registering and connecting the devices 455, 460, 465, and 470 to the smart network device 450. In one example, this includes pairing or bonding each device to the smart network device 450. In further embodiments, for devices not connected to the smart network device, the user connects these devices directly to the update scheduler module 430.

At step 510, the user provides permissions to the update scheduler module 430 to access the smart data of the devices 455, 460, 465, and 470 from the smart network device 450. In embodiments, and as described with respect to FIG. 4, this includes the user providing permission manually by selecting a setting in the smart network device 450.

At step 515, the update scheduler module 430 collects the device information and user setups from the devices 455, 460, 465, and 470 from the smart network device 450. In embodiments, and as described with respect to FIG. 4, this includes the update scheduler module 430 collecting smart data through an API interface of the smart home network device 450. For devices not connected to the smart network device 450, the update scheduler module 430 collects the smart data directly from these devices.

At step 520, the update scheduler module 430 stores the collected smart home data in a service cloud storage. In embodiments, and as described with respect to FIG. 4, this includes the update scheduler module 430 storing the collected smart home data from step 515 into the database 440.

At step 525, the update scheduler module 430 compiles training data from the collected smart home data. In embodiments, and as described with respect to FIG. 4, this includes the update scheduler module 430 labeling the collected smart data in view of the devices 455, 460, 465, 470, and 475.

At step 530, the update scheduler module 430 pre-processes the system state and usage statistics of each device of the devices 455, 460, 465, 470, and 475. In embodiments, and as described with respect to FIG. 4, this includes the update scheduler module 430 classifying the smart data into discrete categories representing the system state of each device.

At step 535, the update scheduler module 430 generates the machine learning model from the training data. In embodiments, and as described with respect to FIG. 4, this includes the update scheduler module 430 defining parameters and objectives for the machine learning model. In one example, an objective of the machine learning model is determining the device is in the inactive system state.

At step 540, the update scheduler module 430 generates the classification data model. In embodiments, and as described with respect to FIG. 4, this includes assigning each discrete category a numerical value. In one example, the SVMs assign a value of 1 for smart data representing the active system state and a numerical value of 0 to smart data representing the inactive system state.

At step 545, the update scheduler module 430 identifies devices which receive updates. In embodiments, and as described with respect to FIG. 4, this includes the update scheduler module 430 performing a handshake with each device of the devices 455, 460, 465, 470, and 475. In embodiments, handshaking allows for establishing communication channels between the update scheduler module 430 and the devices 455, 460, 465, 470, and 475 to identify the devices.

At step 550, the update scheduler module 430 checks the parent services of the devices 455, 460, 465, 470, and 475 for updates. In embodiments, and as described with respect to FIG. 4, this includes the update scheduler module 430 checking whether an update is available for the devices 455, 460, 465, 470, and 475, and whether an update notification is being sent to a device of the devices 455, 460, 465, 470, and 475.

At step 555, the update scheduler module 430 determines whether the update is needed for a device of the devices 455, 460, 465, 470, and 475. In embodiments, and as described with respect to FIG. 4, this includes the update scheduler module 430 determining that the update is available when checking with the parent services.

At step 560, the update scheduler module 430 determines whether the device is in the active system state or the inactive system state. In embodiments, and as described with respect to FIG. 4, this includes the update scheduler module 430 collecting the smart data of the device which needs the update and applying the machine learning model to the smart data to determine the current system state of the device. In further embodiments, the update scheduler module 430 predicts when the device will be in the inactive system state. In embodiments, and as described with respect to FIG. 4, this includes the update scheduler module 430 predicting the device being in the inactive system state in view of the classifications of the device.

At step 565, and as described with respect to FIG. 4, in view of determining the device is in the inactive system state, or predicting the device is in the inactive system state, the update scheduler module 430 automatically schedules an update for application to the device.

At step 570, and as described with respect to FIG. 4, in view of determining that the device is in the active system state or predicting that the device is not in the inactive system state, the update scheduler module 430 automatically withholds application of the update and schedules for applying the update when the device is in the inactive system state. In embodiments, this includes the update scheduler module 430 determining when the device is in the inactive system state by collecting the current smart data for the device and applying the machine learning model to the current smart data. In further embodiments, the update scheduler module 430 identifies the future periods of when the device is in the inactive system state. In response to determining the device is now in the inactive system state, the update scheduler module 430 applies the update.

At step 575, and as described with respect to FIG. 4, in view of automatically scheduling the update, the update scheduler module 430 automatically applies the update to the device and notifies the user of the update. In embodiments, this includes the update scheduler module 430 automatically updating the operating system of the device.

Figure 6A:
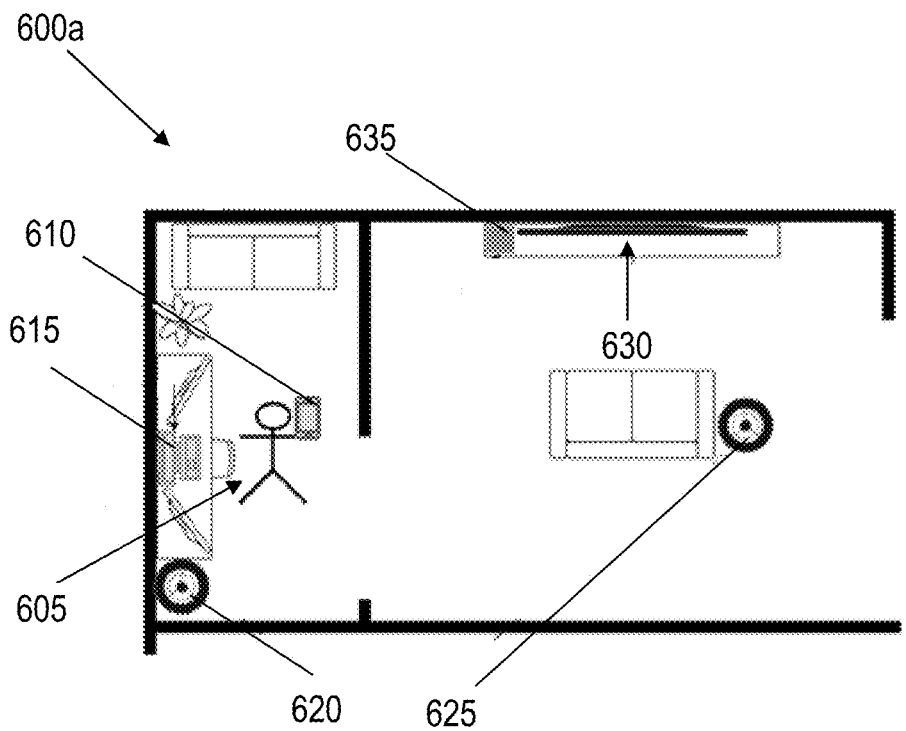
FIGS. 6A and 6B show exemplary use scenarios for devices in accordance with aspects of the invention.
Figure 6B:
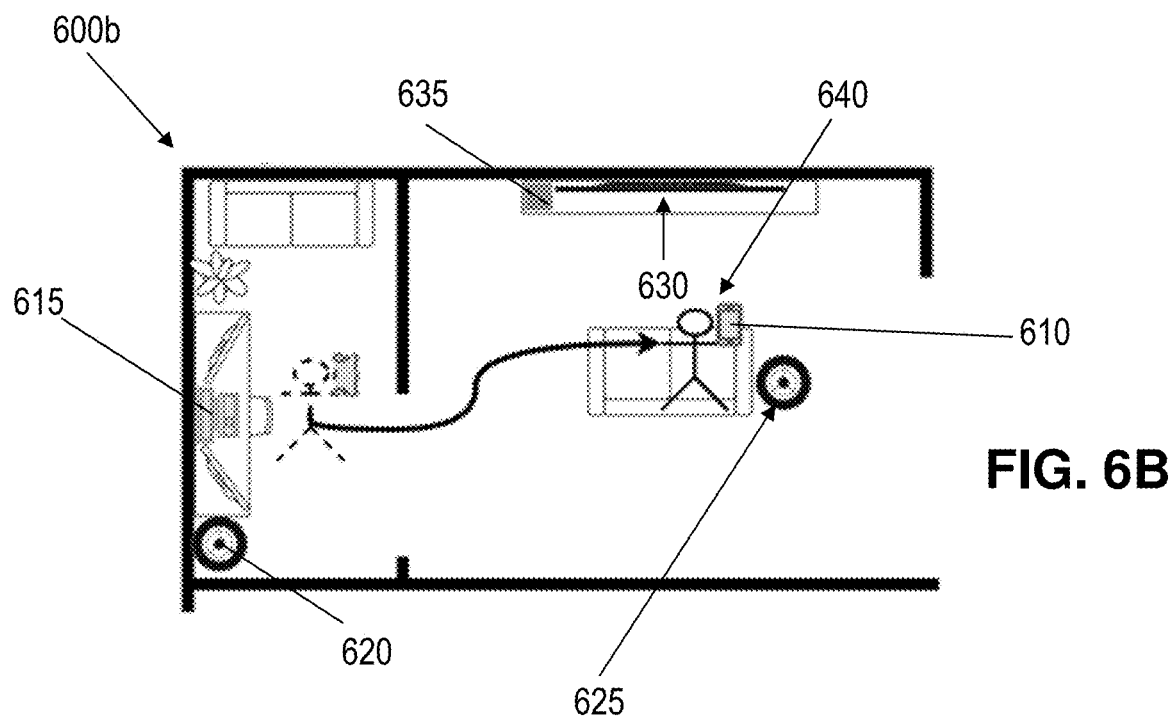

FIGS. 6A and 6B illustrate a first exemplary use case 600a and a second exemplary use case 600b for automatically scheduling updates for devices. In the first use case 600a and as described with respect to FIG. 4, a user is at a first location 605. In one example, the smart phone 610 is targeted for an update by the parent service. In embodiments, from the first location 605 of the user and the smart data of smart phone 610 and the smart data of the other devices 615, 620, the update scheduler module 430 determines that the smart phone device 610 is currently in an active system state. Accordingly, the update scheduler module 430 withholds application of the update until the update scheduler module 430 determines that the smart phone device 610 is in an inactive system state.

Alternatively, in FIG. 6B, the parent service targets the smart computer 615 for an update. In embodiments, the smart data of the smart phone device 610 indicates that the user has left the room the smart computer 615 is within.

Specifically, the location data indicates that the user is in a second location 640. Further, the smart data of devices 625, 630, and 635 indicates that the devices 625, 630, and 635 are in an active system state. Additionally, the smart data indicates that the smart bulb 620 is in an inactive system state. In this way, the update scheduler module 430 determines the smart computer 615 is in inactive system state in view of the second location 640 of the user and the smart data of devices 625, 630, and 635. Accordingly, the update scheduler module 430 applies the update to the smart computer 615.

Embodiments of the invention include the proximity of multiple devices as an input. Embodiments of the invention group the multiple devices together in view of the proximity and infer that a device is in use if a neighboring device is active. For example, there are two rooms: a living room with a smart TV that is on and a smart light bulb that is on, and an office with a computer that is on and idle and a smart light bulb that is off. Embodiments of the invention will not update the smart TV because it is in use. The computer could be updated as the smart light bulb in the office is off and the computer is in low usage.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
registering, by a computer device, devices to a local smart network within a user environment;
collecting, by the computer device, device data from the devices through the local smart network;
compiling, by the computer device, training data from the collected device data;
training, by the computer device, a machine learning model using the training data;
determining, by the computer device, whether a current activity state of each of the devices in the user environment is an active state, wherein a device is currently in use, or an inactive state, wherein a device is not currently in use;
classifying, by the computer device, physical regions of the user environment as an active region or an inactive region based on a current location of a user within the user environment, the current activity states of the devices, and relative locations of the devices with respect to one another in the user environment using the machine learning model;
predicting, by the computer device and using the machine learning model, a time when a target device of the devices will be in an inactive system state based on the classifying the physical regions of the user environment;
checking, by the computer device, whether an update will cause a loss of operation for the target device; and
automatically scheduling, by the computer device, an application of the update for the predicted time when the target device will be in the inactive system state.

2. The method of claim 1, further comprising withholding, by the computer device, the update from the target device in an active system state.

3. The method of claim 2, wherein the withholding the update includes intercepting the update from a parent service of the target device.

4. The method of claim 1, wherein the update is an operating system update.

5. The method of claim 1, further comprising applying, by the computer device, the update to the target device in the inactive system state.

6. The method of claim 5, further comprising notifying, by the computer device, a user of the target device of the application of the update.

7. The method of claim 1, wherein the classifying the physical regions of the user environment comprises classifying, by the computer device, a physical region comprising a room of a building that contains the target device.

8. The method of claim 7, wherein the classifying includes grouping multiple ones of the devices based on their proximity to one another.

9. The method of claim 1, wherein the inactive system state indicates the target device is in a powered state lower than a powered state of the target device in an active system state.

10. The method of claim 1, wherein the inactive system state represents the target device is not in use.

11. The method of claim 1, wherein the collected device data includes location data, room-based data, motion sensor data, and applications running on the devices.

12. The method of claim 1, further comprising determining, by the computer device, inactive regions of the user environment in view of the collected device data.

13. A computer program product comprising one or more computer readable storage media having program instructions collectively stored on the one or more computer readable storage media, the program instructions executable to:
register devices to a local smart network within a user environment;
collect data from the devices through the local smart network;
compile training data from the collected data;

train a machine learning model using the training data;
determine whether a current activity state of each of the devices in the user environment is an active state, wherein a device is currently in use, or an inactive state, wherein a device is not currently in use;
classify physical regions of the user environment which contain the devices as an inactive region or an active region based on a current location of a user within the user environment, the current activity states of the devices, and relative locations of the devices with respect to one another in the user environment using the machine learning model;
predict, using the machine learning model, a time when a target device of the devices will be in an inactive system state based on the classifying the physical regions of the user environment;
check whether the update will cause a loss of operation for the target device; and
automatically schedule an application of an update for the predicted time when the target device is in the inactive system state.

14. The computer program product of claim 13, wherein the program instructions are executable to withhold the update when the target device is in the active region.

15. The computer program product of claim 13, wherein the collected data includes instructions for the devices.

16. The computer program product of claim 13, wherein the program instructions are executable to monitor instructions which indicate the devices are in the inactive region of the user environment.

17. A system comprising:
a processor, a computer readable memory, one or more computer readable storage media, and program instructions collectively stored on the one or more computer readable storage media, the program instructions executable to:
register devices to a local smart network within a user environment;
collect data from the devices including data regarding device groups based on relative proximity of the devices to one another and usage data of the devices, the usage data including whether each of the devices is currently in use or is not currently in use;
compile the collected data as training data;
train a machine learning model using the training data;
classify physical regions of the user environment which contain the devices as an inactive region or an active region based on the machine learning model;
predict a target device of the devices in an inactive region of the user environment is in an inactive system state based on the classifying;
automatically schedule an update for application to the target device when the target device is in the inactive system state;
check whether the update will cause a loss of operation for the target device; and
notify a user of the application of the update to the target device.

18. The system of claim 17, wherein the inactive system state indicates the target device is in a powered state lower than a powered state of the target device being in an active system state.

19. The system of claim 17, wherein the notification includes a notification indicating that the target device is updated on an interface of the target device.

20. The system of claim 17, wherein the collected data includes location data, room based data, motion sensor data, and applications running on the devices.

* * * * *